(12) United States Patent
Collier

(10) Patent No.: US 6,882,827 B1
(45) Date of Patent: Apr. 19, 2005

(54) TESTING RESPONSE OF A RADIO TRANSCEIVER

(75) Inventor: James Digby Yarlet Collier, Cambridgeshire (GB)

(73) Assignee: Cambridge Silicon Radio Ltd., Cambridge (GB)

(*) Notice: Subject to any disclaimer, the term of this patent is extended or adjusted under 35 U.S.C. 154(b) by 314 days.

(21) Appl. No.: 10/031,385

(22) PCT Filed: Jul. 18, 2000

(86) PCT No.: PCT/GB00/02763
§ 371 (c)(1),
(2), (4) Date: Jul. 2, 2002

(87) PCT Pub. No.: WO01/06685
PCT Pub. Date: Jan. 25, 2001

(30) Foreign Application Priority Data

Jul. 19, 1999 (GB) .............................. 9916904

(51) Int. Cl.[7] .............................................. H04B 17/00
(52) U.S. Cl. ................................ 455/67.11; 455/67.14; 455/423; 455/424; 455/73; 455/74; 455/78; 455/88
(58) Field of Search .......................... 455/67.11, 67.14, 455/423, 424, 73, 74, 78, 88, 226.1, 205

(56) References Cited

U.S. PATENT DOCUMENTS

| | | | |
|---|---|---|---|
| 5,109,535 A | | 4/1992 | Kume et al. |
| 5,469,494 A | * | 11/1995 | Ortiz Perez et al. ...... 379/27.01 |
| 5,594,950 A | * | 1/1997 | D'Amico et al. ......... 455/67.11 |
| 5,613,217 A | * | 3/1997 | Hagstrom et al. ........ 455/67.11 |
| 5,768,689 A | * | 6/1998 | Borg ........................ 455/67.14 |
| 5,778,306 A | * | 7/1998 | Kommrusch ................. 455/78 |
| 5,907,797 A | * | 5/1999 | Hanatatsu et al. ........ 455/115.2 |
| 6,006,112 A | * | 12/1999 | Rucki et al. ................. 455/561 |
| 6,122,505 A | * | 9/2000 | Genell et al. ................ 455/423 |
| 6,131,014 A | * | 10/2000 | Nishimura ................ 455/67.13 |
| 6,308,065 B1 | * | 10/2001 | Molinari et al. ............. 455/424 |
| 6,434,364 B1 | * | 8/2002 | O'Riordain .............. 455/67.11 |

FOREIGN PATENT DOCUMENTS

| | | |
|---|---|---|
| EP | 0 599 679 A1 | 6/1994 |
| WO | WO 91/19363 A1 | 12/1991 |

* cited by examiner

Primary Examiner—Marceau Milord
(74) Attorney, Agent, or Firm—Rothwell, Figg, Ernst & Manbeck, p.c.

(57) ABSTRACT

A radio transceiver comprising: an antenna; local oscillator for generating a local oscillator signal at a local oscillator frequency; a receiver capable of receiving a first radio frequency signal from the antenna at a receiver input and having a first mixer for mixing a signal derived from the first radio signal with the said local oscillator signal to generate an intermediate frequency signal, and a receiver output for providing an output signal dependant on the intermediate frequency signal; a transmitter capable of receiving an input signal at a transmitter input and having a second mixer for mixing a signal derived from the input signal with a local oscillator signal to generate a second radio frequency signal for transmission; a switching arrangement having a normal configuration in which the transmitter is coupled to the antenna to apply the second radio frequency signal to the antenna, and a testing configuration in which the transmitter is coupled to the receiver input to apply the second radio frequency signal to the receiver input; and a signal processor coupled to the transmitter input and the receiver output and capable of, when the switching arrangement is in the testing configuration, applying a testing signal to the transmitter input to cause the transmitter to generate a radio frequency test signal, and determining from the output signal of the receiver the response of the receive to the radio frequency test signal.

14 Claims, 1 Drawing Sheet

TESTING RESPONSE OF A RADIO TRANSCEIVER

This invention relates to testing the response of circuits, especially but not exclusively in radio transceivers.

FIG. 1 shows a schematic diagram of a complex (IQ) part of a radio receiver. A received radio frequency (RF) signal is received at 1 and amplified by amplifier 2. The output of the amplifier at 3 is split to mixers 4 and 5. Mixer 4 generates an in-phase (I) demodulated signal at 6 by mixing the signal at 3 with a signal $LO_I$ of local oscillator frequency $f_{LO}$. Mixer 4 generates a quadrature (Q) demodulated signal at 6 by mixing the signal at 3 with a signal $LO_Q$ which also has frequency $f_{LO}$ but is orthogonal to signal $LO_I$—that is signal $LO_Q$ is out of phase by 90° with respect to signal $LO_I$.

In practice, it is difficult to ensure that signals $LO_I$ and $LO_Q$ are precisely orthogonal, or that the gains or group delays of mixers 3 and 4 and filters 8 and 9 are precisely equal. The result of this is that image responses are introduced. No realisable receiver has infinite image rejection. Instead of trying to avoid image frequencies altogether, most receiver specifications set a lower limit on the image rejection that is to be achieved. To check that a particular receiver meets the specification it must be tested after having been manufactured. This generally requires specific testing equipment in the production line and calls for extra time in the production line to allow the testing to take place.

In the manufacturing process receivers can be adjusted to optimise their image rejection. However, this takes further time, and does not address the fact that the image rejection performance of the receiver in actual use may be different from that measured during manufacture, for example due to temperature changes.

According to the present invention there is provided a radio transceiver comprising: an antenna; a local oscillator for generating a local oscillator signal at a local oscillator frequency; a receiver capable of receiving a first radio frequency signal from the antenna at a receiver input and having a first mixer for mixing a signal derived from the first radio signal with the said local oscillator signal to generate an intermediate frequency signal, and a receiver output for providing an output signal dependant on the intermediate frequency signal; a transmitter capable of receiving an input signal at a transmitter input and having a second mixer for mixing a signal derived from the input signal with a local oscillator signal to generate a second radio frequency signal for transmission; a switching arrangement having a normal configuration in which the transmitter is coupled to the antenna to apply the second radio frequency signal to the antenna, and a testing configuration in which the transmitter is coupled to the receiver input to apply the second radio frequency signal to the receiver input; and a signal processor coupled to the transmitter input and the receiver output and capable of, when the switching arrangement is in the testing configuration, applying a testing signal to the transmitter input to cause the transmitter to generate a test signal at a frequency of the difference between the local oscillator frequency and the intermediate frequency, and determining from the output signal of the receiver the response of the receiver to the test signal.

The present invention also provides a method of testing a radio transceiver comprising an antenna; a local oscillator for generating a local oscillator signal at a local oscillator frequency; a receiver capable of receiving a first radio frequency signal from the antenna at a receiver input and having a first mixer for mixing a signal derived from the second radio signal with the said local oscillator signal to generate an intermediate frequency signal, and a receiver output for providing an output signal dependant on the intermediate frequency signal; a transmitter capable of receiving an input signal at a transmitter input and having a second mixer for mixing a signal derived from the input signal with a local oscillator signal to generate a second radio frequency signal for transmission; a switching arrangement having a normal configuration in which the transmitter is coupled to the antenna to apply the second radio frequency signal to the antenna, and a testing configuration in which the transmitter is coupled to the receiver input to apply the second radio frequency signal to the receiver input; the method comprising: setting the switching arrangement to the testing configuration; applying a testing signal to the transmitter input to cause the transmitter to generate a radio frequency test signal; and detecting the output signal of the receiver to determine the response of the receiver to the radio frequency test signal.

The receiver may have in-phase and quadrature channels. The in-phase and quadrature channels may each include mixers (one of which is the said first mixer) for mixing with a signal from the local oscillator at the local oscillator frequency. One of those mixers suitably mixes with an in-phase signal and the other suitably mixes with a quadrature signal. The local oscillator preferably includes a phase shifter for generating one of the in-phase and quadrature signals from the other (although the signals could be generated separately in the local oscillator). The local oscillator is preferably adjustable by the signal processor, most preferably to alter the phase difference between the in-phase and quadrature signals. Thus the phase shifter of the oscillator (where present) is most preferably adjustable by the signal processor.

The test signal is preferably at a frequency at which it is undesired for the transceiver to receive signals—for example an image frequency of the transceiver. The signal processor is preferably capable of adjusting the local oscillator (most preferably the phase difference between the local oscillator's in-phase and quadrature signals) and/or the gain(s) of the mixer(s) of the receiver to reduce, and most preferably minimise, the response of the receiver to the test signal, that is suitably to increase/maximise the image rejection of the receiver. The said reduction/minimisation is preferably performed in response to the signal received by the signal processor from the receiver.

Preferably the said mixer(s) of the receiver and the mixer(s) of the transmitter receive their local oscillator signals from the same local oscillator.

The signal processor may be provided as a single integrated circuit, as more than one integrated circuit or as a circuit of discrete components. The signal processor may include a digital synthesiser for generating the testing signal and/or a modulator for generating the testing signal. The testing signal is suitably a modulated signal. The testing signal is preferably at the negative of the said intermediate frequency of the receiver.

The radio transceiver may have a second switching arrangement having a normal configuration in which the testing signal is coupled to the second mixer and a testing configuration in which the testing signal is coupled to an intermediate frequency section of the receiver. In that case the signal processor may be capable of, when the second switching arrangement is in the testing configuration, generating a testing signal, and determining from the output signal of the receiver the response of at least the intermediate frequency section of the receiver to the test signal.

The transceiver is preferably capable of switching automatically between the normal configuration and the testing configuration. The transceiver may suitably be configured to switch automatically to the testing configuration on enabling of the receiver and/or the transceiver, and/or in response to a signal that may be applied to the transceiver during manufacture or testing.

In a further aspect of the invention the test signal may be at an intermediate frequency and may be applied directly to an intermediate frequency section of the receiver.

The present invention will now be described by way of example, with reference to the accompanying drawings, in which.

Figures 1, 2:
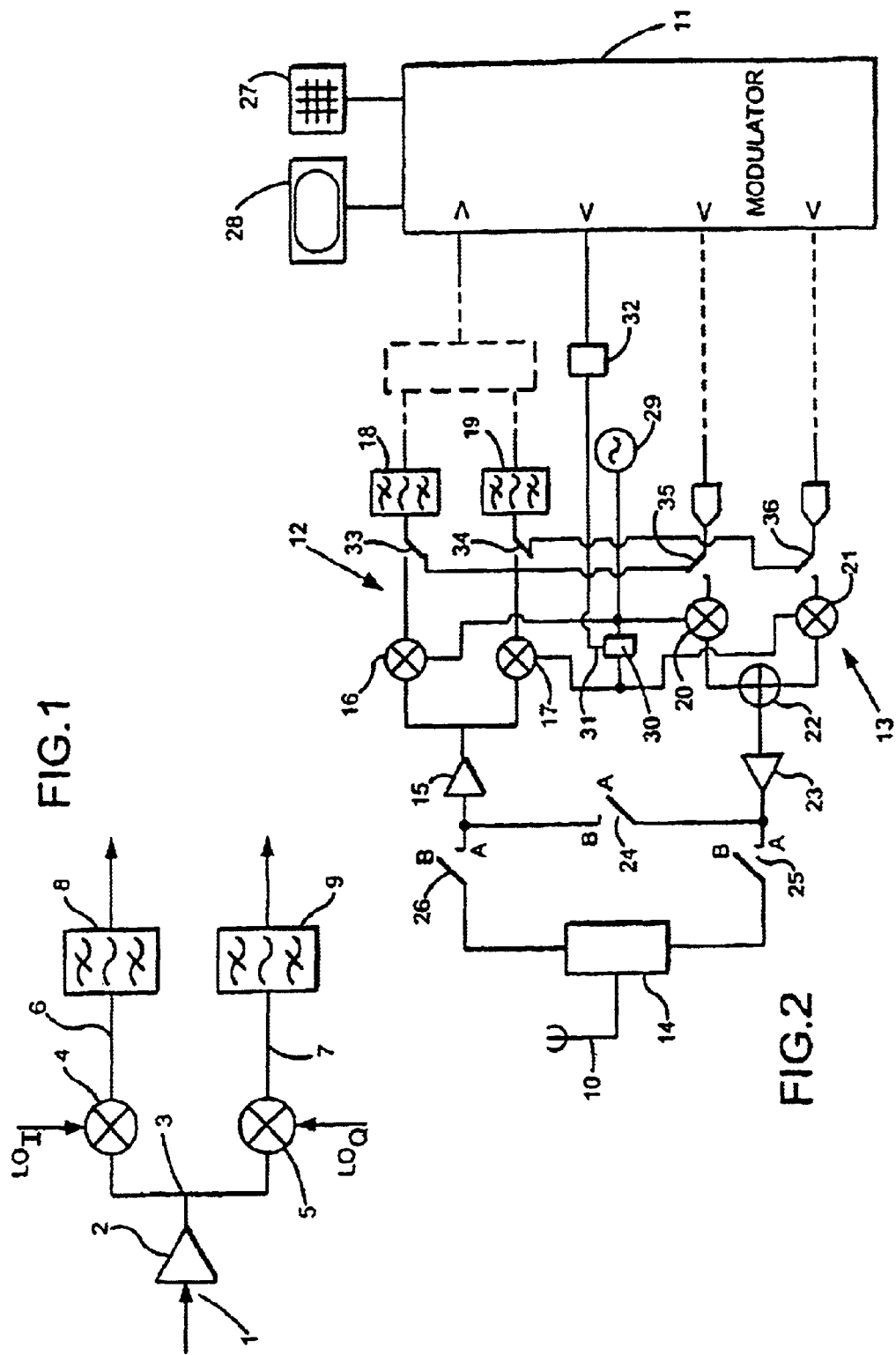
FIG. 1 shows a prior art receiver circuit.
FIG. 2 shows a schematic diagram of part of a radio receiver circuit according to the present invention.

FIG. 2 shows part of a radio transceiver circuit. The circuit has an antenna 10 and a signal processing unit 11 for baseband or intermediate frequency processing of received signals and signals that are to be transmitted. Between the antenna and the signal processing unit are a receive chain 12 and a transmit chain 13, which are connected to the antenna 10 by a duplexer 14. The receive chain 12 converts received radio frequency (RF) signals down to baseband for further processing by the signal processing unit 11, and the transmit chain 13 converts signals up from baseband to RF for transmission from the antenna 10.

The receive chain is shown in partial detail, and comprises an input amplifier 15 which amplifies the received signal. The output of the amplifier 15 is split to mixers 16 and 17 where it is mixed with orthogonal local oscillator signals as described above to generate I and Q signals for further decoding. Band pass filters 18 and 19 filter the I and Q signals respectively.

The transmit chain is also shown in partial detail. In the transmit chain I and Q signals deriving from the signal processing unit 11 that are to be transmitted by the transceiver are mixed with orthogonal local oscillator signals in mixers 20 and 21 and then summed in summation unit 22. The sum signal is then amplified by amplifier 23 and passed to the duplexer 14 and then the antenna 10 for transmission.

In this transceiver there is provision in the form of switch 24 for the input of amplifier 15 to be connected to the output of the summation unit 22. At the same time the output of the summation unit 22 can be disconnected by switch 25 from the input of the amplifier 15 and the input of amplifier 15 can be disconnected by switch 26 from the duplexer 14, although the effects of those connections could be neutralised in other ways. In one mode (settings A in FIG. 2) the switches 24–26 can be set to allow the transceiver to operate as normal. In the other mode (settings B in FIG. 2) the switches 24–26 can be set to allow the transceiver to operate in a self-test mode whereby the image rejection performance of the receiver can be checked. The switches could be mechanical or electronic switches (e.g. transistors). The switches 24–26 could be operable under the control of the signal processing unit 11 in order to allow the self-test procedure to be performed fully automatically.

The self-test procedure could be actuated by entering a command using the keypad 27 of the transceiver, or in another way—for example by the actuation of a dedicated switch of the transceiver, automatically on turn-on of the transceiver or by a command transmitted to the signal processor 11 by radio. Upon actuation of the self-test mode the receiver limb of the transceiver is actuated and tuned to a frequency $f_{LO}+f_{IF}$, where $f_{LO}$ is the local oscillator frequency and $f_{IF}$ is the receiver's intermediate frequency. Due to imperfection of the receiver there will be a weaker image response at frequency $f_{LO}-f_{IF}$. In the transmit limb of the transceiver the modulator of the signal processor 11 is set to generate a signal at a negative frequency $-f_{IF}$ at baseband. That signal is mixed up to radio frequency by the complex mixer 20, 21 to produce a signal at frequency $f_{LO}-f_{IF}$. Due to imperfection of the transmitter there will also be an image frequency at $f_{LO}+f_{IF}$. The switches 24–26 are set to settings B so that the output of the transmit chain (at $f_{LO}-f_{IF}$ and $f_{LO}+f_{IF}$) is passed to the RF input of the receive section. $f_{LO}$ can be set anywhere in the normal local oscillator frequency range—suitably around mid-band. The receiver generates an output in the normal way. The output is thus responsive to the principal signal from the transmit chain (at frequency $f_{LO}-f_{IF}$) and the image signal from the transmit chain (at frequency $f_{LO}+f_{IF}$) provided it is on-channel for the receiver.

The output from the receiver is detected and measured in the normal way by the signal processor 11, and the strength of the image frequency relative to the principal frequency is determined. This gives a measure of the transceiver's image rejection. This result can be displayed on a display 28 of the transceiver or transmitted by radio to another unit, for example a manufacturing test unit. The transceiver can thus make the measurement of image rejection during manufacture a fully automated process requiring no additional testing equipment. This makes in-line self testing highly convenient.

The transceiver generates the I and Q local oscillator signals by means of an oscillator 29 operating at the selected local oscillator frequency $f_{LO}$, the output of which represents the local oscillator I signal and is phase shifted by phase shifter 30 to form the Q signal. The amount of phase shift imposed by the phase shifter is finely adjustable by an analogue signal to its tuning input 31. The analogue signal is derived from an analogue-to-digital converter 32 responsive to the signal processor 11. The generation of the I and Q signals could be done in other ways, for example with the aid of a servo amplifier.

The signal processor 11 can act to improve the image rejection performance of the receiver. It can enter a mode (for example after manufacture, at turn-on or periodically during use) in which it measures the image rejection performance of the receiver as described above and then adjusts the phase shifter 30 to optimise image rejection.

In order for the above process to work the receiver's intermediate frequency must be within the modulation range of the transmitter section of the transceiver. This is likely to be straightforward for near-zero IF receivers, which are becoming increasingly common.

It is possible also to provide a links between the IF part of the transmitter and the IF part of the receiver (e.g. using switches 33–36). An additional step may then be introduced to further optimise the receiver. The switches 33–36 may be set to connect the IF part of the transmitter to that of the receiver. Then the signal processor generates a baseband signal at $-f_{IF}$ which is applied directly to the IF input of the receiver. If the filters (e.g. IF complex channel filters) of the receiver are tuneable by the signal processor 11 then by monitoring the output of the receiver circuit during this process the signal processor can set up the IF section optimally before optimising the RF section.

Another testing procedure can be performed by setting the switches 33–36 to their testing setting and the signal processor 11 generating a range of frequencies around $+f_{IF}$. This allows the signal processor to monitor the on-channel response of the receiver and may be especially useful for built-in self-testing.(BIST).

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A radio transceiver comprising:

an antenna;

a local oscillator for generating a local oscillator signal at a local oscillator frequency;

a receiver capable of receiving a first radio frequency signal from the antenna at a receiver input and having a first mixer for mixing a signal derived from the first radio signal with the said local oscillator signal to generate an intermediate frequency signal, and a receiver output for providing an output signal dependant on the intermediate frequency signal;

a transmitter capable of receiving an input signal at a transmitter input and having a second mixer for mixing a signal derived from the input signal with a local oscillator signal to generate a second radio frequency signal for transmission;

a switching arrangement having a normal configuration in which the transmitter is coupled to the antenna to apply the second radio frequency signal to the antenna, and a testing configuration in which the transmitter is coupled to the receiver input to apply the second radio frequency signal to the receiver input; and a signal processor coupled to the transmitter input and the receiver output and capable of, when the switching arrangement is in the testing configuration, applying a testing signal to the transmitter input to cause the transmitter to generate a radio frequency test signal, and determining from the output signal of the receiver the response of the receiver to the radio frequency test signal.

2. A radio transceiver as claimed in claim 1, wherein the local oscillator is capable of generating an in-phase signal and a quadrature signal, the first mixer is arranged to mix the said signal derived from the first radio signal with the in-phase signal, and the receiver comprises a third mixer arranged to mix the said signal derived from the first radio signal with the quadrature signal.

3. A radio transceiver as claimed in claim 2, wherein the local oscillator is adjustable by the signal processor to vary the phase difference between the in-phase and quadrature signals.

4. A radio transceiver as claimed in claim 2, wherein the local oscillator is adjustable by the signal processor to vary the phase difference between the in-phase and quadrature signals so as to reduce the response of the receiver to the test signal.

5. A radio transceiver as claimed in claim 2, wherein the gain of at least one of the first and third mixers is adjustable by the signal processor so as to reduce the response of the receiver to the test signal.

6. A radio transceiver as claimed in claim 4, wherein the switching arrangement is operable by the signal processor, and the signal processor has a testing mode in which it is capable of: setting the switching arrangement to the testing configuration, determining from the output signal of the receiver the response of the receiver to the radio frequency test signal, and adjusting the local oscillator and/or at least one of the first and third mixers to reduce the response of the receiver to the test signal.

7. A radio transceiver as claimed in claim 1, wherein the receiver comprises at least two intermediate frequency stages.

8. A radio transceiver as claimed in claim 1, wherein the local oscillator signal applied to the second mixer is generated by the said local oscillator.

9. A radio transceiver as claimed in claim 1, wherein the signal processor includes a digital synthesiser for generating the test signal.

10. A radio transceiver as claimed in claim 1, wherein the signal processor includes a modulator for generating the test signal.

11. A radio transceiver as claimed in claim 1, wherein the testing signal is at the negative of the intermediate frequency.

12. A radio transceiver as claimed in claim 1, including a second switching arrangement having a normal configuration in which the said signal derived from the input signal is coupled to the second mixer and a testing configuration in which the said signal derived from the input signal is coupled to an intermediate frequency section of the receiver as a testing signal.

13. A radio transceiver as claimed in claim 12, wherein the signal processor is capable of, when the second switching arrangement is in the testing configuration, generating the testing signal, and determining from the output signal of the receiver the response of at least the intermediate frequency section of the receiver to the testing signal.

14. A method of testing a radio transceiver comprising an antenna; a local oscillator for generating a local oscillator signal at a local oscillator frequency; a receiver capable of receiving a first radio frequency signal from the antenna at a receiver input and having a first mixer for mixing a signal derived from the first radio signal with the said local oscillator signal to generate an intermediate frequency signal, and a receiver output for providing an output signal dependant on the intermediate frequency signal; a transmitter capable of receiving an input signal at a transmitter input and having a second mixer for mixing a signal derived from the input signal with a local oscillator signal to generate a second radio frequency signal for transmission; a switching arrangement having a normal configuration in which the transmitter is coupled to the antenna to apply the second radio frequency signal to the antenna, and a testing configuration in which the transmitter is coupled to the receiver input to apply the second radio frequency signal to the receiver input; the method comprising:

setting the switching arrangement to the testing configuration;

applying a testing signal to the transmitter input to cause the transmitter to generate a radio frequency test signal; and detecting the output signal of the receiver to determine the response of the receiver to the test signal.

\* \* \* \* \*